United States Patent [19]

Sanford

[11] 4,163,562
[45] Aug. 7, 1979

[54] INFLATABLE PACKER

[76] Inventor: Lawrence Sanford, 4047 Hollister, Houston, Tex. 77055

[21] Appl. No.: 788,418

[22] Filed: Apr. 18, 1977

[51] Int. Cl.² ............................................. F16J 15/40
[52] U.S. Cl. .................................................. 277/34.3
[58] Field of Search ..................... 277/34, 34.2, 34.6

[56] References Cited
U.S. PATENT DOCUMENTS

| 2,231,282 | 2/1941 | Norris | 277/34.6 |
| 2,695,065 | 11/1954 | Baker et al. | 277/34.6 |
| 3,044,553 | 7/1962 | Bradley | 277/34 |

Primary Examiner—Robert I. Smith
Attorney, Agent, or Firm—Browning, Bushman & Zamecki

[57] ABSTRACT

The invention comprises an inflatable packer comprising a tubular mandrel having a port extending radially therethrough. An elastomeric valve element is resiliently urged against the exterior of the mandrel to cover the port. A generally tubular packer body surrounds the mandrel and comprises a pair of longitudinally spaced apart heads, one of which is longitudinally slidable on the mandrel, and a tubular radially expandable packer element interposed between the heads. Fluid communication is provided between the radially outer side of the said port and a fluid reception chamber. The packer body is operatively associated with the chamber and responsive to fluid pressure therein to radially extend the packer element.

18 Claims, 9 Drawing Figures

FIG.6A
FIG.6B
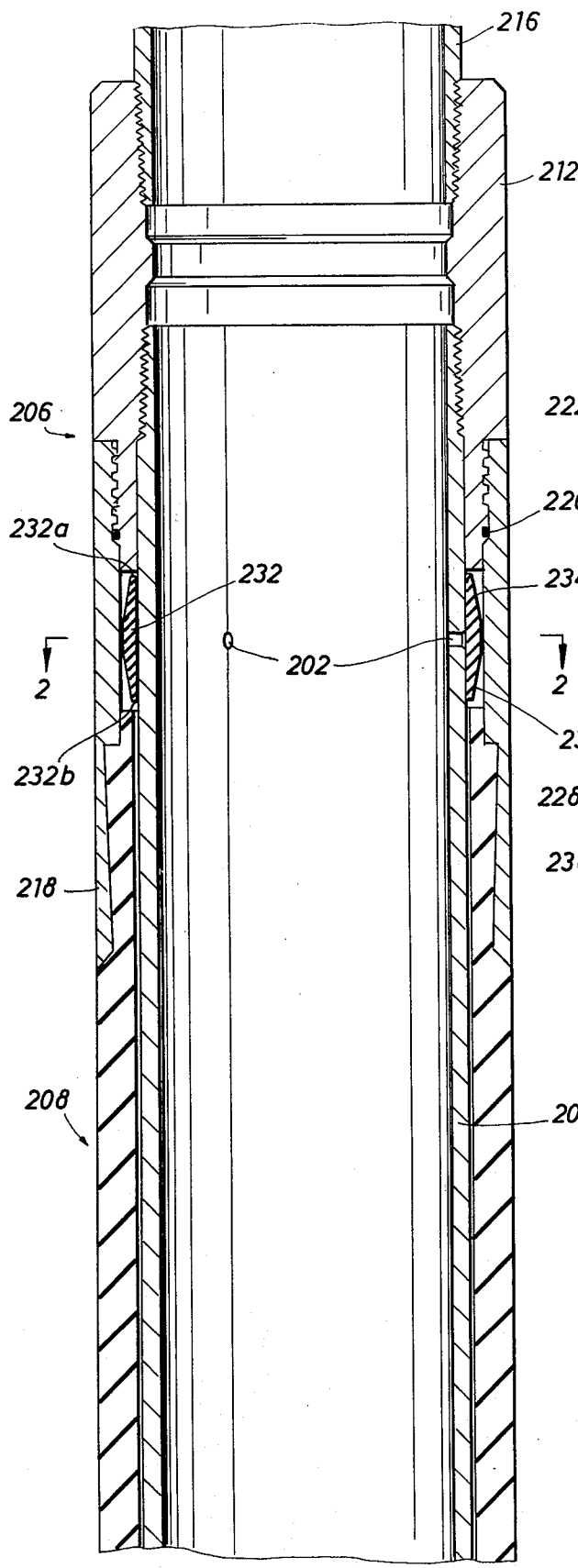
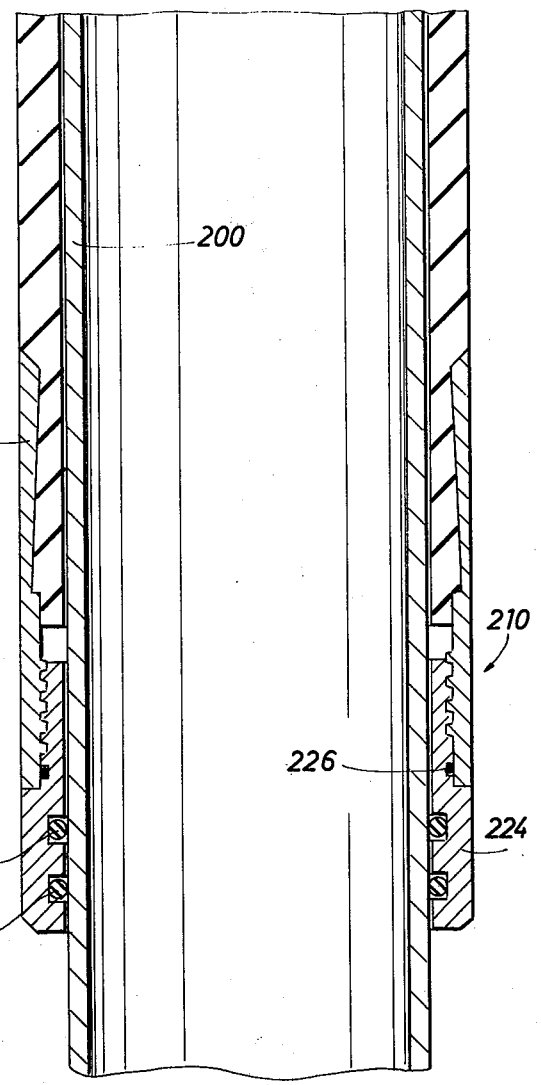
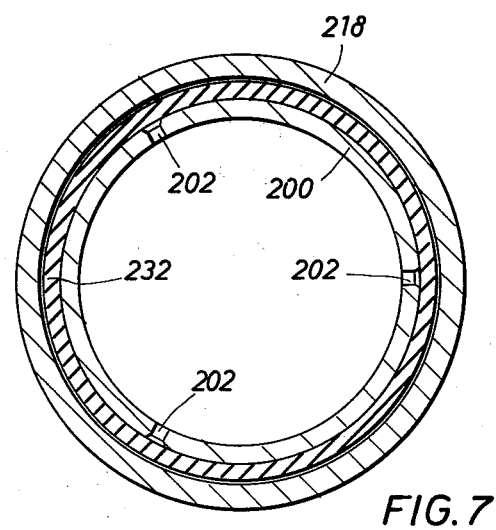
FIG.7

INFLATABLE PACKER

BACKGROUND OF THE INVENTION

1. Field of the Invention

The present invention pertains to hydraulic and pneumatic set packers and particularly to an improved valve arrangement for such packers. One type of hydraulic or pneumatic set packer is the inflatable packer. In general such packers comprise a generally tubular mandrel which may be connected into or form a part of the drill string, operating string or the like. The packer body, also generally tubular, surrounds the mandrel. Said body typically comprises a pair of heads, one of which is slidably mounted on the mandrel and one of which is fixed, and an inflatable, tubular packer element interconnecting the two heads. A port extends radially through the mandrel and communicates with the area between the packer body and the mandrel to permit fluid pressure to be introduced to the area to inflate the packer. A valve means must be provided to prevent the fluid from leaking back out through the radial port so that the packer may be maintained in inflated condition. In many packers, if they are of the releasable variety, means must be provided for selectively opening the valve.

Another type of packer which may be hydraulically or pneumatically set is referred to herein as a squeeze type packer. This type packer also includes a mandrel having a radial port and a valve associated therewith. The packer element, rather than being inflatable, is radially extended by driving one of the packer heads toward the other thereby axially compressing the packer element between the heads. An actuation chamber communicates with the radially outer side of the port and a piston in the chamber is operatively associated with one of the heads to drive it toward the other head.

2. Description of the Prior Art

The valve structures currently available in conventional packers suffer from numerous disadvantages. The most common of these is that the valves are unduly complicated and involve numerous parts. Such valves are not only expensive but are also subject to failure due to a number of different causes such as jamming of parts by debris from the well; damage to small intricately configured parts; galling, corrosion, and the like; springing of metal parts; misalignment of relatively moving parts; and many more. U.S. Pat. Nos. 3,085,628 and 3,437,142 are exemplary of typical valve arrangements for inflatable packers and illustrate their relative complexity.

U.S. Pat. No. 2,177,601 shows another valve structure for an inflatable packer. In this case the valve element is relatively simple, being comprised of a cup-like metal closure member spring biased over the radial port. However, this structure too is subject to failure as the relatively small metallic spring which biases the closure member and which protrudes from the exterior of the mandrel is vulnerable to bending, breaking, etc. Furthermore, the structure does not provide a sufficiently positive seal against back flow of fluid from the annulus between the packer body and mandrel back into the mandrel. In particular, even when the valve element is properly seated, only a small contact or seal area is provided. If any small particles of rock or the like become lodged between the valve element and the mandrel, the effectiveness of the seal may be even further reduced.

Accordingly there is need in the field for a simple but highly effective valve structure for a fluid set packer.

SUMMARY OF THE INVENTION

The packer of the present invention comprises an improved valve structure including an elastomeric valve element resiliently urged against the exterior of the mandrel and covering the port. In the preferred embodiments of the invention, the valve element is a continuous elastomeric ring surrounding the mandrel. The ring preferably has a pair of oppositely axially facing ends and a radially outer surface including respective pressure reaction sections adjacent each of the ends, each of the pressure reaction sections being radially inwardly tapered toward the respective end.

To set the packer, fluid pressure is pumped through the mandrel. This fluid can force its way past the elastomeric valve element, by expanding the valve element radially outwardly, and into a fluid reception chamber, such as the area between the mandrel and packer body in an inflatable packer or the actuating chamber of a hydraulic set squeeze packer. However, fluid tending to flow back into the interior of the mandrel from the chamber will urge the valve element into even tighter sealing engagement with the external surfaces of the mandrel surrounding the port to prevent such flow. This effect is further enhanced by the tapered pressure reaction sections of the preferred embodiments.

Thus, the valve of the present packer, while extremely simple, is highly effective and reliable and is not subject to the numerous problems associated with presently available valve structures. In particular, the elastomeric valve element is not highly susceptible to fatal damage. It may be formed of an extremely durable material such as polyurethane and presents a smooth, low profile exteriorly of the mandrel with no small projections or appendages which might become jammed, sprung, broken, etc. If the valve element is scarred, or slightly misaligned, its sealing capabilities are not destroyed. Likewise, even if small particles of rock or the like should find their way into the area between the valve element and the mandrel, its elastomeric qualities allow it to deform about the foreign particle and maintain sealing contact with the mandrel.

Additional advantages of the invention include its adaptability. For instance it may be incorporated into both releasable packers and permanent set packers. Furthermore, the valve element is readily replaceable whereby a given packer can be easily adapted to set at various pressures.

Accordingly, it is a principal object of the present invention to provide a fluid set packer including an improved valve structure.

Another object of the invention is to provide a simple but highly reliable valve structure for a fluid set packer.

Still another object of the present invention is to provide a valve structure including an easily replaceable valve element for varying the actuating pressure of a fluid set packer.

Still other objects, features, and advantages of the present invention will be made apparent by the following description of the preferred embodiments, the drawings and the claims.

BRIEF DESCRIPTION OF THE DRAWINGS

FIGS. 6A and 6B are longitudinal cross-sectional views of the upper and lower halves respectively of a permanent inflatable packer according to the present invention.

FIG. 7 is a transverse cross-sectional view taken on lines 7—7 of FIGS. 6A.

DESCRIPTION OF THE PREFERRED EMBODIMENTS

Figure 1A:
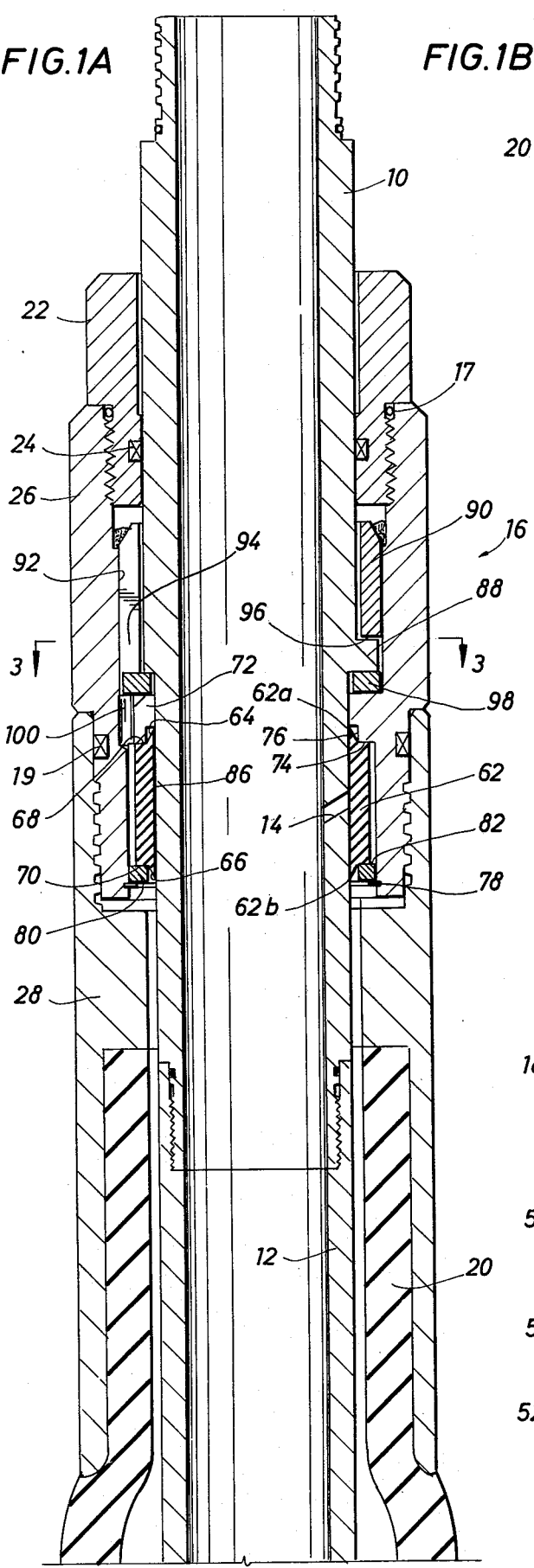
FIGS. 1A and 1B are longitudinal cross-sectional views of the upper and lower halves respectively of a releasable inflatable packer according to the present invention in inflated condition.
Figure 1B:
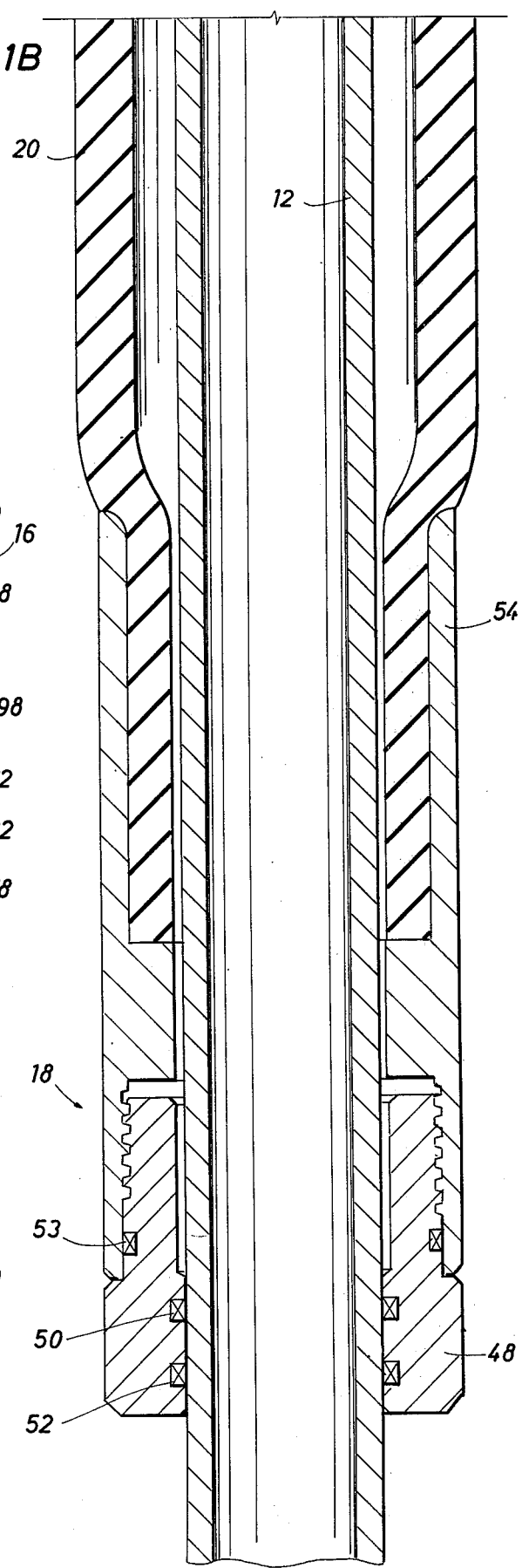
Figure 2:
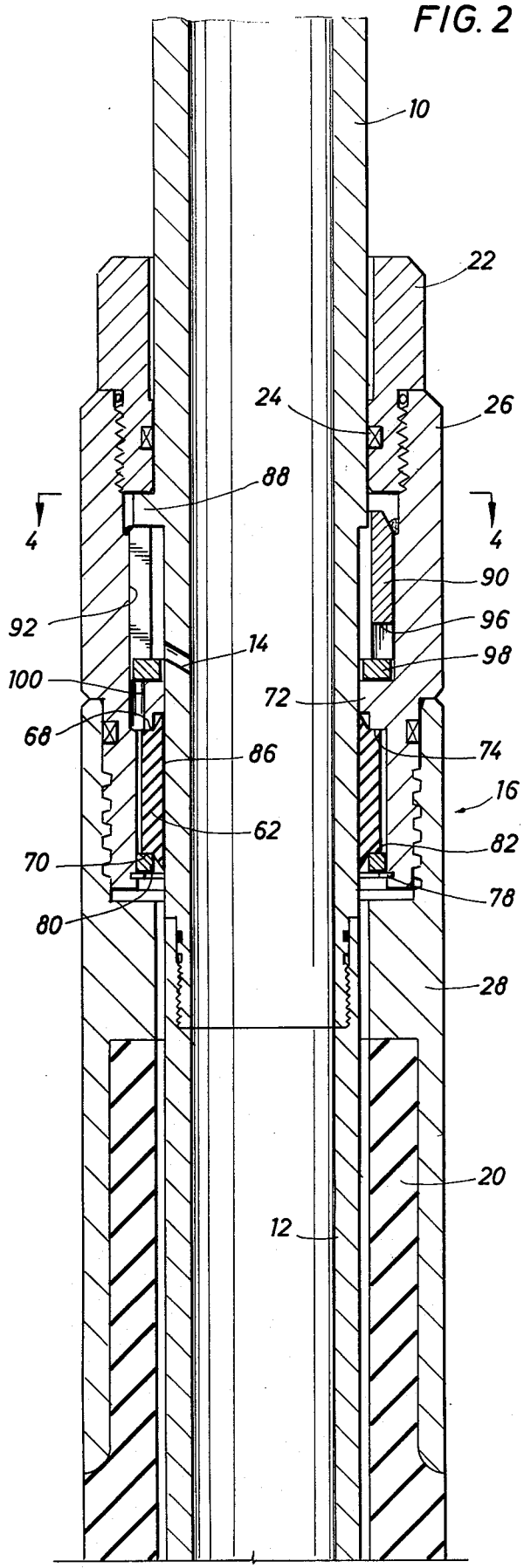
FIG. 2 is a view similar to that of FIG. 1A showing the upper half of the tool in released condition.
Figure 3:
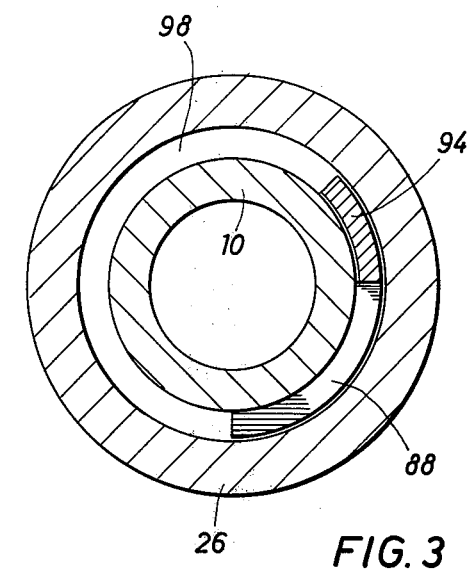
FIG. 3 is a transverse cross-sectional view taken on lines 3—3 of FIG. 1A.
Figure 4:
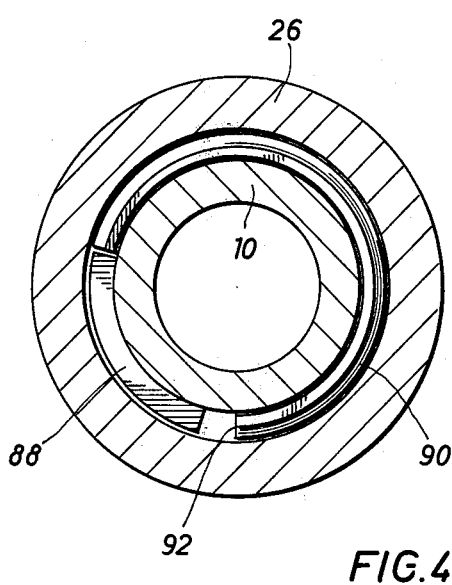
FIG. 4 is a transverse cross-sectional view taken on lines 4—4 of FIG. 2.
Figure 5:
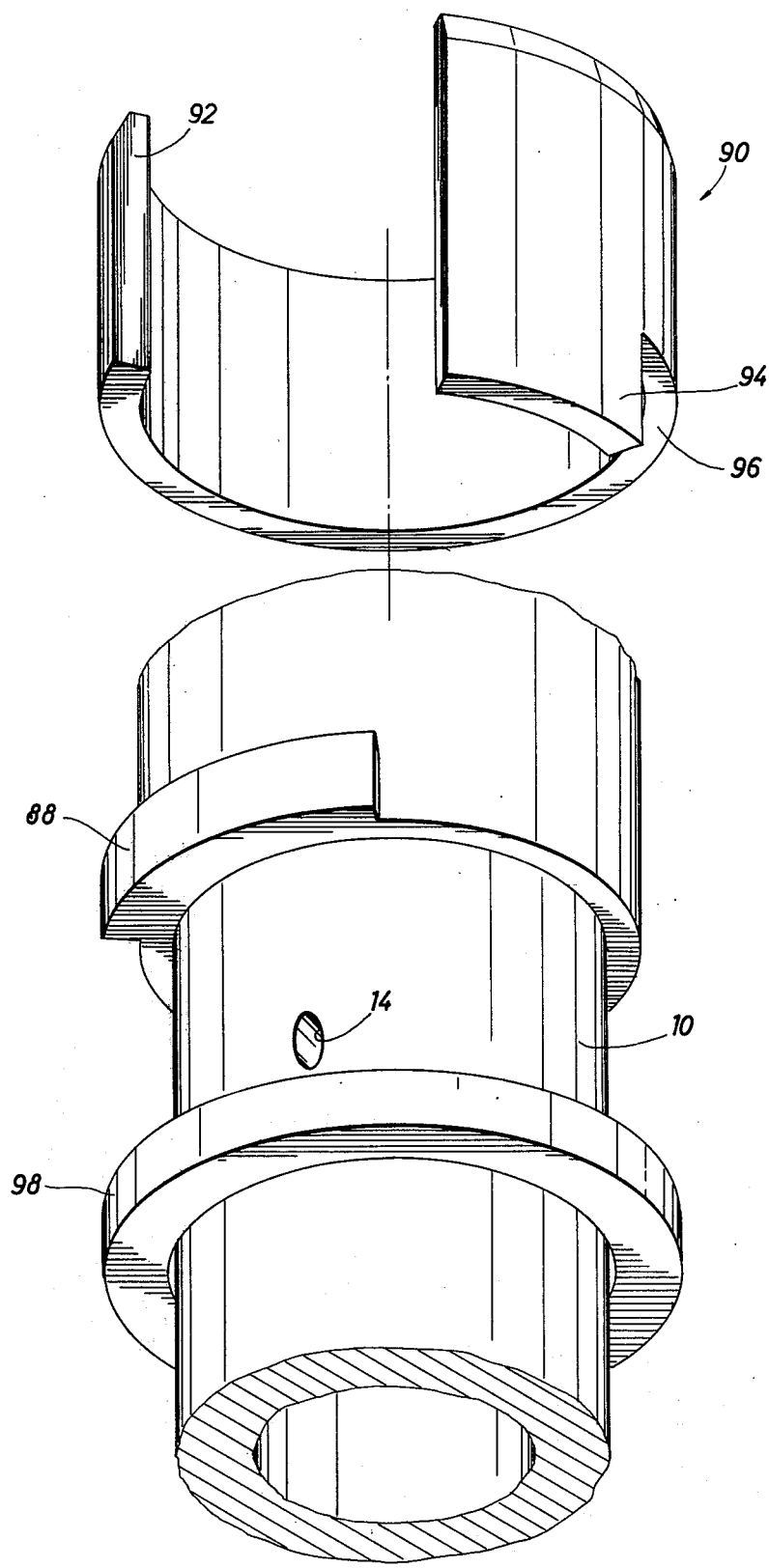
FIG. 5 is an exploded perspective view of the releasable lock means of the tool of FIGS. 1A-4.

Referring now to FIGS. 1A and 1B, there is shown a releasable inflatable packer including two main bodies, a mandrel body and a packer body. The mandrel body is generally tubular and is formed of two sections 10 and 12 threadedly connected together. Upper section 10 has a threaded pin formed at its upper end whereby the tool can be connected to an operating string or the like. The lower end of lower section 12 (now shown) may be provided with a similar pin or with a threaded box. Upper section 10 has a port 14 extending through its wall. Port 14 is generally radially extending although it has a slight upward inclination.

The packer body is also generally tubular and is disposed in surrounding relation to the mandrel 10, 12. The packer body includes a pair of generally annular, longitudinally spaced apart heads 16 and 18 interconnected by a generally tubular inflatable packer element 20. Upper head 16 is shown in FIG. 1A in its first or locked position with respect to mandrel 10, 12. Head 16 is formed in three sections threadedly connected together and sealed to each other by seal rings 17 and 19. Top section 22 has a portion providing a relatively close sliding fit against the mandrel section 10 and having an internal annular groove for receipt of a seal ring 24 for sealing between the mandrel and the upper head. Middle section 26 of upper head 16 has an inner diameter substantially greater than the outer diameter of the mandrel whereby an annular space is formed for receipt of a lock mechanism to be described more fully below. Bottom section 28 of head 16 extends downwardly for attachment to the packer element 20 in a manner well known in the art.

The lower head 18 includes a bottom section 48 which is quite similar to top section 22 of upper head 16. Section 48 provides a relatively close sliding fit with mandrel section 12 and is sealed thereto by seals 50 and 52 carried in internal annular grooves in section 48. Lower head 18 is intended to slide freely on the mandrel and there is no need for lock means therein. Consequently, section 48 is directly secured to a top section 54 essentially identical to section 28 of the upper head and sealed thereto by seal ring 53. The lower portion of the packer element 20 is secured to section 54 in the same manner as the upper portion is secured to section 28.

A valve element in the form of a sleeve 62 of polyurethane or other suitable elastomer is snugly disposed about mandrel section 10 to cover port 14. Sleeve 62 is urged radially inwardly against the mandrel by its own elasticity. Sleeve 62 has oppositely axially facing ends 62a and 62b and the radially outer surface of sleeve 62 forms a pair of pressure reaction sections 64 and 66 adjacent respective ones of the ends 62a and 62b. Each of the pressure reaction sections 64 and 66 is tapered radially inwardly toward its respective end 62a or 62b. At the longitudinally inner extremities of the pressure reaction sections 64 and 66 there are formed respective oppositely axially outwardly facing stop surfaces 68 and 70.

Head section 26 has an annular flange 72 extending radially inwardly. The lower surface 74 of flange 72 opposing and abuts stop surface 68 and is counterbored at its radially inner extremity at 76 to accommodate the pressure reaction section 64. A snap ring 78 is disposed in an internal groove in head section 26 in a position spaced downwardly from flange 74 and supports a retainer ring 80. The upper surface 82 of ring 80 opposes and abuts stop surface 70 of the sleeve 62. Thus even though the sleeve 62 is snugly disposed about and carried by the mandrel section 10, surfaces 74 and 82 form a pair of opposed retainer surfaces cooperative with stop surfaces 68 and 70 to restrict longitudinal movement of the sleeve 62 with respect to the head section 26 of the packer body assembly. Thus if the mandrel assembly and head 16 move longitudinally with respect to each other, sleeve 62 will remain with the head 16 and will slide along the mandrel. FIG. 1A shows the mandrel and upper head 16 in their first position, in which the sleeve 62 overlies the port 14.

To inflate the packer a plug is pumped through the operating string and mandrel 10, 12 until it lands on a seat (not shown) which may be carried by the lower mandrel section 12 in a manner well known in the art. Alternatively, lower mandrel section 12 may be permanently plugged. Further fluid is then pumped through the operating string and mandrel and, as the pressure builds up within the interior of mandrel 10, 12 and port 14, it will eventually overcome the force of the sleeve 62 and deform the sleeve outwardly so that fluid can pass into the chamber formed by the area between the mandrel assembly and the packer body assembly. As the element 20 is expanded radially outwardly, the lower head 18 slides upwardly along the mandrel.

When the packer is fully inflated, the pressure within mandrel 10, 12 may be relieved. Fluid within the space between the mandrel and packer body is prevented from flowing back through the port 14 by the sleeve 26. In particular, such fluid will exert a radially inward force on sleeve 62 to urge it into even tighter engagement with the exterior surface of the mandrel, and the tapered pressure reaction sections 64 and 66 enhance this fluid dynamic effect.

It should also be noted that the longitudinal extent of sleeve 62 is substantially greater than the longitudinal extent of the portion of mandrel section 10 which is subtended by the port 14. Thus the radially inner sealing surface 86 of the sleeve 62 sealingly engages areas of substantial size on axially opposite sides of the port 14 whereby an extremely effective positive seal is achieved. In particular the seal is not destroyed if the sleeve 62 becomes slightly misaligned. Furthermore, if dust, rock particles or other foreign matter should find its way between the sleeve 62 and mandrel, the elastomeric sleeve can deform to the configuration of such matter so that, again, the seal is not lost.

To releasably retain the mandrel 10, 12 and head 16 in the first position a locking mechanism is provided. Numerous different types of mechanisms may be used for this purpose, and only one is shown in FIGS. 1A-5 by way of example only. The exemplary locking mechanism includes a key 88 extending radially outwardly from mandrel section 10 in the area enclosed by head section 26. A pad 90 is welded to the interior of head section 26 to form an internal J-slot formation for receipt of the key 88. The pad 90 is a partial annular member having a radial break or discontinuity 92 therethrough and an appendage 94 extending downwardly adjacent one edge of the break 92. Thus when the pad 90 is secured in place, a partial annular circumferentially extending slot section 96 is formed having stops or limits defined by the side edges of appendage 94. The break 92 forms a longitudinally extending slot section communicating with section 96. A bearing ring 98 of brass or other suitable material rests on the upper surface of flange 72 and in effect defines the bottom of both the circumferentially and the longitudinally extending slot sections.

It can be seen that in the first position, key 88 is disposed within the circumferentially extending slot section 96. Thus relative longitudinal movement of the mandrel 10, 12 and the upper head 16 is prevented by engagement of key 88 with the lower end of pad 96 and the upper end of ring 98 although limited relative rotation is permitted.

To release the packer from its inflated condition, the mandrel 10, 12 is rotated via the operating string until the key 88 strikes the edge of appendage 94 adjacent the break 92. The key 88 is now disposed in the longitudinally extending slot section 92 and the mandrel 10, 12 can be moved upwardly relative to the head 16 to a second position shown in FIGS. 2 and 4. In this position, the port 14 and sleeve 62 are offset so that fluid can flow from the area between the packer body and mandrel into the interior of the mandrel. A longitudinal bore 100 is provided in flange 72 to assist in and assure proper flow of fluid past the flange.

Referring now to FIGS. 6A-7 there is shown a second embodiment of the invention. The second embodiment represents an example of a permanent inflatable packer, as opposed to the releasable packer described above. Although permanent packers may be used in various ways, the exemplary embodiment shown in FIGS. 6A-7 is of the type known as a casing packer which is connected into a string of casing and used to seal against the walls of the well bore, a typical and common use of permanent packers. The embodiment of FIGS. 1A-5, on the other hand is designed to be connected into a drill string or operating string and used to seal against a well casing or the like. However, it should be understood that such environments and uses are only representative, and that each type of packer, with appropriate modifications well within the skill of the art, may be used in various other contexts.

The packer of FIGS. 6A-7 comprises a unitary tubular mandrel body 200 having radial ports 202 therethrough. If desired, only a single port 202 may be employed. The packer body comprises an upper head 206, a lower head 210, and a connecting tubular packer element 208. Upper head 206 comprises a top section or collar 212 which is threadedly connected to the mandrel 200 to fixedly mount head 206. Collar 202 also extends upwardly from mandrel 200 and has its upper end portion internally threaded to receive the lower end portion of a section of casing 214. A bottom section or mounting sleeve 218 of the upper head is threadedly connected to the collar 212 and sealed thereto by an o-ring 220. The upper portion of the elastomeric packer element 208 is secured to the sleeve 218 in any suitable manner. The lower portion of element 208 is similarly secured to an identical sleeve 222 of the lower head 210. Sleeve 222 is in turn threadedly connected to a bottom section 224 of the head 210 and sealed thereto by o-ring 226. Section 224 provides a sliding fit with the exterior of the mandrel 200 and carries seal rings 228 and 230 for sealing against the mandrel.

An elastomeric sleeve 232 snugly surrounds the mandrel 200 and covers the ports 202 to serve as a valve element. Sleeve 232 has oppositely axially facing ends 232a and 232b which form stop surfaces for the sleeve 232. The lower end of collar 212 and the upper end of packer 208 oppose ends 232a and 232b respectively and serve as retainer surfaces to limit longitudinal movement of the sleeve 232 so that it cannot be displaced from ports 202. The radially outer surface of sleeve 232 has pressure reaction sections 234 and 236 adjacent ends 232a and 232b respectively, each pressure reaction section being tapered radially inwardly toward the respective end.

To inflate the packer, the internal pressure in mandrel 200 is increased in any suitable manner as is known in the art. For example, the lower end of the casing string in which the packer is disposed may be plugged by means of a shoe or the like (not shown). Fluid pressure may then be applied to the interior of mandrel 200 via the casing string and, as in the previous embodiment, the fluid pressure will eventually become great enough to overcome the force of sleeve 232 and leak into the area between the mandrel 200 and the packer body thereby inflating the element 208. As before, fluid tending to leak back into the mandrel will act against the radially outer surface of the sleeve 232, and particularly against sections 234 and 236 to urge the sleeve 232 into even tighter sealing engagement with the mandrel. The primary difference between the packer of FIGS. 6A-7 and that of FIGS. 1A-5 is that the former, once inflated or set, cannot be released.

It can thus be seen that the present invention provides a unique valve structure which is extremely simple, its main component comprising a durable but readily replaceable elastomeric valve element. Nevertheless, the sealing capabilities of the valve are superior to those of more complicated, expensive, and easily damaged valve structures.

It can also be appreciated that numerous modifications of the preferred embodiments described above may be made by those skilled in the art without departing from the spirit of the invention. For example, the valve element might in some instances be a small patch of limited circumferential extent rather than a complete sleeve. It might then be stretched and adhesively secured to the mandrel on three sides. The patch could alternatively be resiliently urged against the exterior of the mandrel by an adjustable strap secured to the patch to encircle the mandrel, by biasing means carried by the adjacent head of the packer body, or by any other suitable means. In the latter instances, the pressure required for setting the packer could be varied by adjustment of the strap or biasing means.

In any event, the setting pressure can be varied by replacement of the valve element by one of different size, configuration, or durometer value. The setting pressure can also be varied by adjustments of other parts of the packer, e.g., by changing the diameter of the port through the mandrel. This can be accomplished without re-machining by providing a threaded radial bore in the mandrel for receipt of a replaceable externally threaded orifice ring, the inner diameter of which defines the port.

Other modifications could involve elimination of the need for fluid dynamic sealing on both sides of the port, e.g., by providing a clamp or the like to effect the seal at one end of the valve element, leaving the other end to seal in a dynamic fashion.

The valve structure of the invention can also be employed in fluid set packers other than inflatable packers. For example, in a squeeze type packer the valve structure could be used to control the flow of fluid between the mandrel and an actuating chamber or cylinder containing a piston for driving one of the packer heads toward the other.

Numerous other modifications will suggest themselves to those skilled in the art. It is thus intended that the scope of the invention be limited only by the claims which follow.

I claim:

1. A fluid set packer comprising:
   a generally tubular mandrel body having a port extending generally radially therethrough;
   an elastomeric valve element resiliently urged against the exterior of said mandrel body, and overlying said port, and said valve element having a radially inner sealing surface for said valve element having a radially inner sealing surface for sealingly engaging said mandrel body adjacent said port, said sealing surface being substantially straight in longitudinal cross section, one axially facing free end adjacent said sealing surface, and a radially outer surface, said outer surface having one pressure reaction section adjacent said one end and radially inwardly tapered toward said one end;
   a packer body carried externally of said mandrel body and comprising a pair of longitudinally spaced apart heads, one of said heads being longitudinally slidable with respect to said mandrel body, and a generally tubular radially extendable packer element interposed between said heads;
   and means defining a fluid reception chamber in communication with the radially outer side of said port;
   said packer body being operatively associated with said chamber and responsive to fluid pressure within said chamber to radially extend said packer element;
   and said valve element being operative while overlying said port to permit fluid flow from said mandrel body through said port to said chamber but prevent fluid flow from said chamber through said port to said mandrel body.

2. The packer of claim 1 being an inflatable packer, wherein said heads are generally annular, said packer element is a generally tubular inflatable element interconnecting said heads, said packer body generally coaxially surrounds said mandrel body, and said chamber is defined by the area between said packer body and said mandrel body.

3. The packer of claim 2 wherein said valve element is a continuous elastomeric ring surrounding said mandrel body.

4. The packer of claim 3 wherein said valve element has another end facing axially opposite from said one end.

5. The packer of claim 4 wherein said other end is a free end and wherein said outer surface of said valve element has another pressure reaction section adjacent said other end radially inwardly tapered toward said other end.

6. The packer of claim 5 wherein said valve element is sleeve-like.

7. The packer of claim 2 wherein said mandrel body has a first position with respect to said packer body in which said packer body overlies said port.

8. The packer of claim 7 wherein the other of said heads overlies said port in said first position.

9. The packer of claim 8 wherein said valve element has a pair of oppositely axially facing stop surfaces, and wherein said packer body comprises means defining a pair of retainer surfaces each opposed to a respective one of said stop surfaces to restrict longitudinal movement of said valve element with respect to said other head.

10. The packer of claim 9 further comprising lock means cooperative between said mandrel body and said other head for locking said mandrel body in said first position and releaseable to permit relative longitudinal movement between said mandrel body and said other head to a second position in which said port is longitudinally displaced from said valve element.

11. The packer of claim 10 wherein said lock means includes key means extending radially from one of said bodies and means defining slot means on the other of said bodies for receipt of said key means, said slot means having a circumferentially extending section for limiting relative longitudinal movement between said mandrel body and said other head when said key is disposed in said circumferentially extending section, and a longitudinally extending section communicating with said circumferentially extending section for permitting movement between said first and second positions when said key is disposed in said longitudinally extending section, said bodies being at least partially relatively rotatable.

12. The packer of claim 2 wherein the other of said heads is fixedly mounted on said mandrel body.

13. The packer of claim 12 wherein one of said assemblies includes retainer means for restricting longitudinal movement of said valve element with respect to said mandrel body.

14. The packer of claim 1 wherein said valve element is removably mounted in said packer.

15. A fluid set packer comprising:
   a generally tubular mandrel body having a port extending generally radially therethrough;
   an elastomeric valve element resiliently urged against the exterior of said mandrel body;
   a packer body carried externally of said mandrel body and comprising a pair of longitudinally spaced apart heads, one of said heads being longitudinally slidable with respect to said mandrel body, and a generally tubular radially extendable packer element interposed between said heads, said packer body further including retainer means operative to restrict longitudinal movement of said valve element with respect to the other of said heads;

and means defining a fluid reception chamber in communication with the radially outer side of said port;

said packer body being operatively associated with said chamber and responsive to fluid pressure within said chamber to radially extend said packer element;

and said mandrel body having a first position in which said valve element overlies said port, said valve element being operative when said mandrel body is in said first position to permit fluid flow from said mandrel body through said port to said chamber but prevent fluid flow from said chamber through said port to said mandrel body, said mandrel body further having a second position in which said port is longitudinally displaced from said valve element.

16. The packer of claim 15 wherein the other of said heads overlies said port when said mandrel body is in said first position, wherein said valve element has a pair of oppositely axially facing stop surfaces, and wherein said retainer means comprises a pair of retainer surfaces each opposed to a respective of said stop surfaces.

17. The packer of claim 16 further comprising lock means cooperative with said mandrel body and said other head for locking said mandrel body in said first position and releasable to permit relative longitudinal movement between said mandrel body and said other head to said second position.

18. The packer of claim 17 wherein said lock means includes key means extending radially from one of said bodies and means defining slot means on the other of said bodies for receipt of said key means, said slot means having a circumferentially extending section for limiting relative longitudinal movement between said mandrel body and said other head when said key is disposed in said circumferentially extending section, and a longitudinally extending section communicating with said circumferentially extending section for permitting movement between said first and second positions when said key is disposed in said longitudinally extending section, said bodies being at least partially relatively rotatable.

* * * * *

UNITED STATES PATENT AND TRADEMARK OFFICE
CERTIFICATE OF CORRECTION

PATENT NO. : 4,163,562
DATED : August 7, 1979
INVENTOR(S) : Lawrence Sanford

It is certified that error appears in the above—identified patent and that said Letters Patent is hereby corrected as shown below:

In Column 7, lines 35 and 36, delete "said valve element having a radially inner sealing surface for".

Signed and Sealed this

Twelfth Day of February 1985

[SEAL]

Attest:

DONALD J. QUIGG

Attesting Officer Acting Commissioner of Patents and Trademarks